No. 863,138. PATENTED AUG. 13, 1907.
S. C. BEALE.
PUMPING MECHANISM FOR BALING PRESSES.
APPLICATION FILED APR. 28, 1904.

4 SHEETS—SHEET 1.

WITNESSES
INVENTOR
Samuel C. Beale
BY Hazard & Harpham
ATTORNEYS

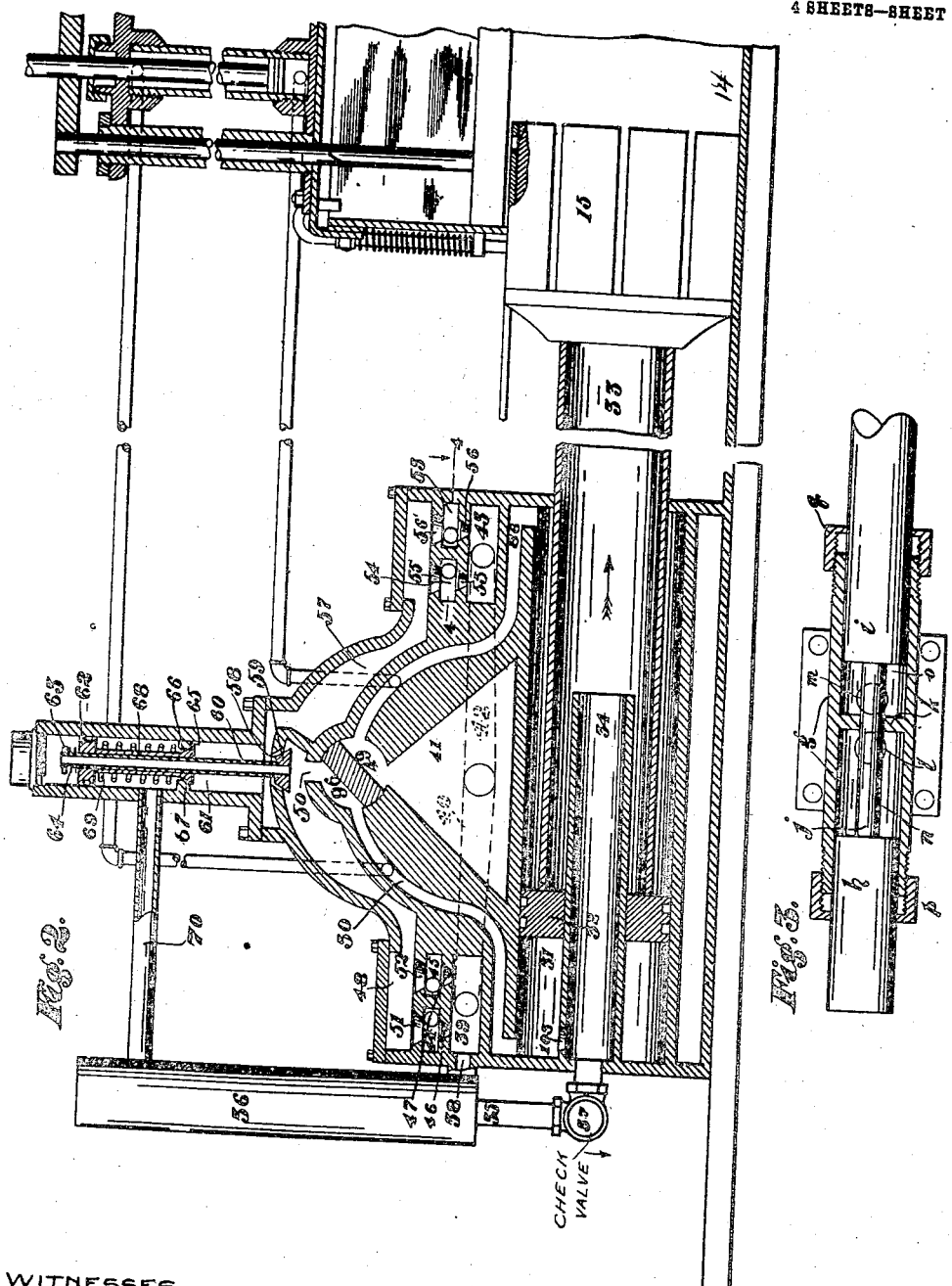

No. 863,138. PATENTED AUG. 13, 1907.
S. C. BEALE.
PUMPING MECHANISM FOR BALING PRESSES.
APPLICATION FILED APR. 28, 1904.
4 SHEETS—SHEET 3.
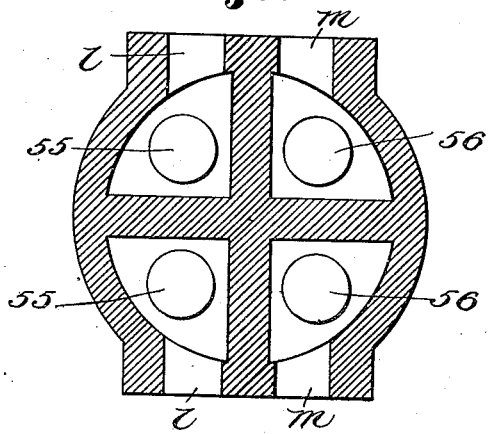
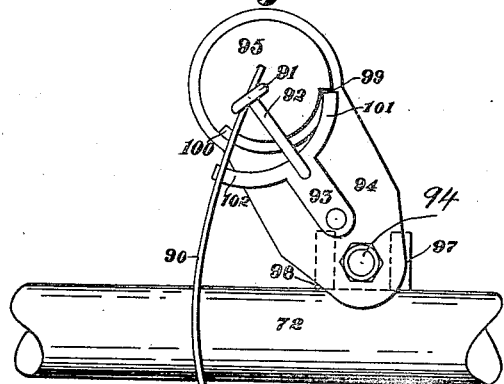
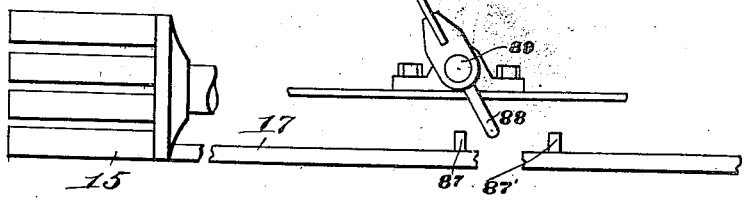
WITNESSES
INVENTOR.
Samuel C. Beale
BY Hazard & Harpham
ATTORNEYS.

No. 863,138. PATENTED AUG. 13, 1907.
S. C. BEALE.
PUMPING MECHANISM FOR BALING PRESSES.
APPLICATION FILED APR. 28, 1904.

4 SHEETS—SHEET 4.

WITNESSES

INVENTOR
Samuel C. Beale
BY Hazard & Harpham
ATTORNEYS

UNITED STATES PATENT OFFICE.

SAMUEL C. BEALE, OF LOS ANGELES, CALIFORNIA, ASSIGNOR TO BEALE MANUFACTURING CO., OF SANTA ANA, CALIFORNIA, A CORPORATION OF CALIFORNIA.

PUMPING MECHANISM FOR BALING-PRESSES.

No. 863,138.

Specification of Letters Patent.

Patented Aug. 13, 1907.

Application filed April 28, 1904. Serial No. 205,385.

*To all whom it may concern:*

Be it known that I, SAMUEL C. BEALE, a citizen of the United States, residing at Los Angeles, in the county of Los Angeles and State of California, have invented new and useful Improvements in Pumping Mechanism for Baling-Presses, of which the following is a specification.

My invention relates to a press designed to compress by hydraulic power any desired material such as hay, straw, cotton, and the like; and the object thereof is to produce a baling machine with great power and rapid action.

In the accompanying drawings forming a part of this application I have illustrated my press adapted for baling hay and will describe it herein as applied to that purpose.

Figure 1:
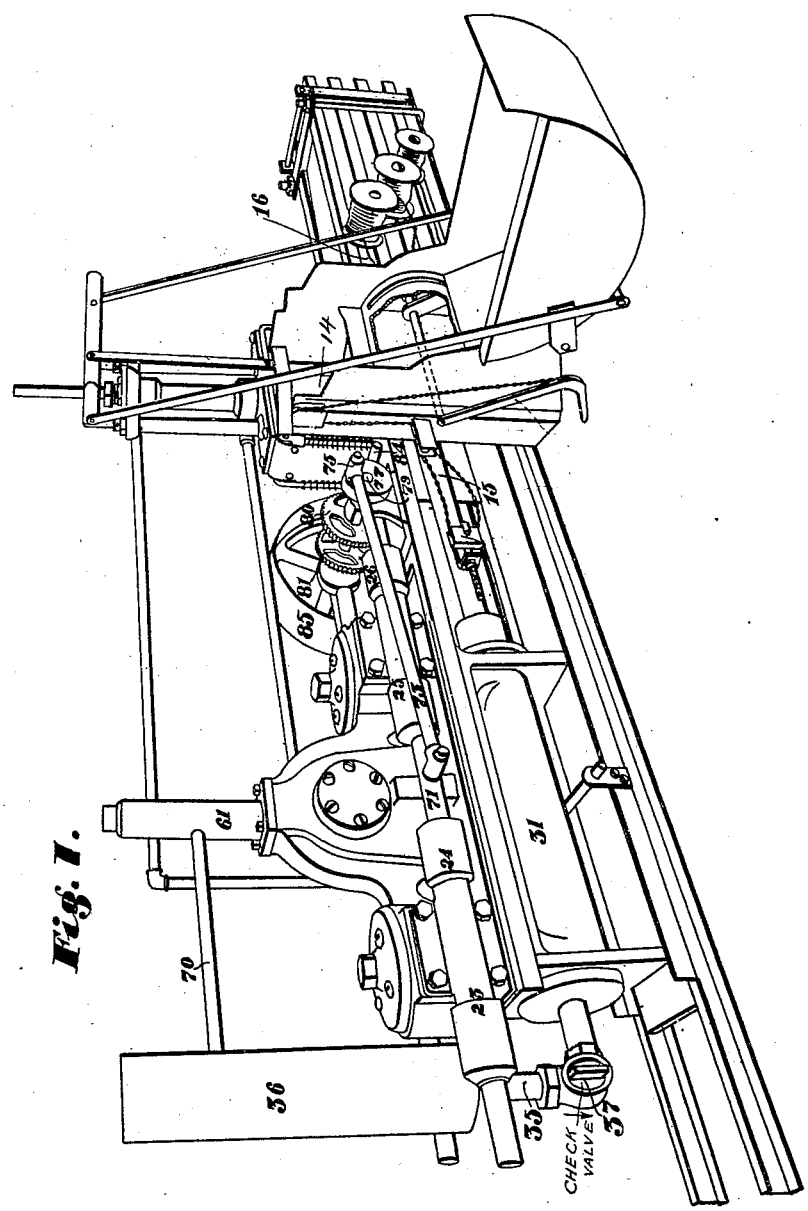
Figure 6:
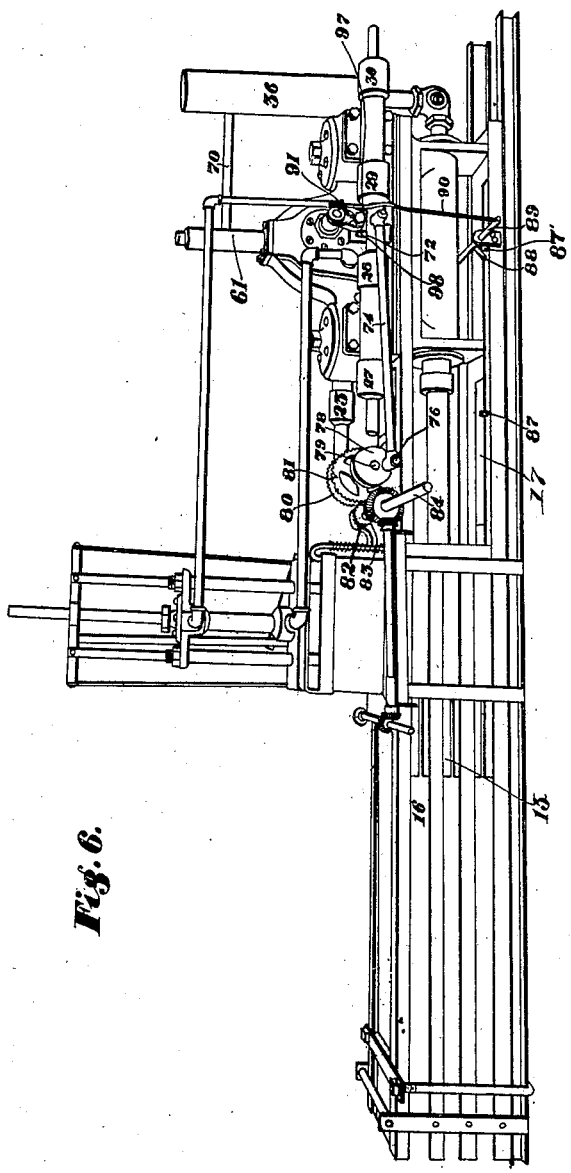

In the drawings Figure 1 is a perspective view taken from the feed side of the machine of the working parts thereof, the supporting mechanism being omitted for clearness of illustration. Fig. 2 is a central vertical longitudinal section of the hydraulic mechanism with certain connected parts shown in elevation. Fig. 3 is a central vertical longitudinal section of two adjacent pump chambers with the pistons and connecting rod shown in elevation. Fig. 4 is a section on the line 4—4 of Fig. 2 looking in the direction indicated by the arrow. Fig. 5 is a side elevation of the exterior portion of the hydraulic valve reversing mechanism. Fig. 6 is a side elevation of the parts shown in Fig. 1 looking at the machine from the opposite side.

The hay being in the lower part of reception chamber 14 the compression plunger 15 then moves therethrough pushing the hay into the baling chamber 16. This movement of the compression plunger is caused by the pumps 23, 25, 27 and 29, which as the compression plunger moves through the bottom of the reception chamber to push the hay into the baling chamber are forcing oil through channel 30 into the rear end of compression cylinder 31 in which cylinder piston 32 reciprocates. Compression piston 32 is provided with a hollow stem 33 which is rigidly secured to the compression plunger 15 and operates the same. Within the compression cylinder and passing through the compression piston is a hollow abutment cylinder 34 which is rigidly attached to the end wall of the compression cylinder. Now when the compression piston is moving in the direction of the arrow in Fig. 2 it will be observed that the pressure of the oil is exerted against the face of the piston which surrounds this abutment cylinder, thereby causing the piston to move very rapidly until it reaches a point beyond the end of this abutment cylinder when the oil will enter the hollow piston stem and thereafter will bear against that portion of the head of the compression plunger which is uncovered by the hollow piston stem as well as upon the face of the piston, which will cause a much slower movement of the compression plunger but will give it a much greater power, as the area subjected to hydraulic pressure is doubled. To prevent a vacuum being formed in the abutment cylinder, a pipe 35 connects the interior thereof with oil reservoir 36. On this pipe is a downwardly opening check valve 37 which permits the oil to pass from the reservoir through pipe 35 but prevents its return. The oil reservoir is connected by channel 38 with supply chamber 39. Which supply chamber is connected by pipe 40 shown in dotted lines in Fig. 2, with distributing chamber 41. A pipe 42 shown in dotted lines in Fig. 2 connects with a supply chamber 43 on the opposite side thereof. Above supply chamber 39 are the suction chambers 44 and 45, and the communication between these respective chambers and the supply chambers is controlled by upwardly opening check valves 46 and 47. Above these suction chambers is a channel 48 which is in communication with valve chamber 49 through port 50. The communication between the suction chambers and this channel is controlled by the upwardly opening check valves 51 and 52.

Above the supply chamber 43 are suction chambers 53 and 54 and the communication between said chambers and the supply chamber 43 is controlled by the upwardly opening check valves 55 and 56. Above these last suction chambers is a channel 57 which is in communication therewith controlled by check valves 55' and 56' and with channel 48 through port 58. Port 58 is adapted to be controlled by valve gate 59 which is mounted on the hollow stem 60, which stem passes upwardly through the regulating valve chamber 61 and through a piston 62 mounted in said valve chamber and is provided with a nut 63 on the end thereof. Between said nut and said piston is a spiral spring 64 which is adapted normally to hold valve gate 59 to close port 58.

The regulating valve chamber has a partition 65 therein provided with a port 66 therethrough which is controlled by valve gate 67 secured to the hollow stem 68 which stem is rigidly secured to piston 62. Intermediate this piston and partition is coiled spring 69 which is adapted to normally hold valve gate 67 to close port 66 in partition 65. That portion of the valve regulating chamber between the partition and piston is in communication with the oil reservoir through the pipe 70. In Fig. 3 I have shown a detail of two adjacent pump chambers in which g is the pump barrel and h and i are the pistons therein which are connected together by the stem j. A partition wall k separates the two pumping chambers, the stem j passing therethrough. Ports l and m open into the pumping chambers n and o adjacent to the partition walls separating the pumping chambers and there are stuffing boxes p and q on the ends of the pump barrels. There are eight pumping chambers altogether which are arranged in pairs and each pumping chamber is connected by channels with the suction chambers, of which channels there is one for each of the eight different pumping chambers and which open into separate suction chambers whose relative location are shown in detail in Fig. 4.

The pistons of the respective pairs of pumps on each side of the machine are connected together by connecting rods 71 and 72 to which are secured pitman rods 73 and 74. These pitman rods are connected to the crank pins 75 and 76 carried by the crank disks 77 and 78 which are mounted upon shaft 79. On this shaft are mounted gears 80 and 81 which mesh with smaller gears 82 and 83 mounted on the driving shaft 84 which carries the power pulley 85, to which power is applied to operate the machine from any suitable driving mechanism not shown. Now when power is applied to rotate the driving shaft it will be seen that the pump pistons are reciprocated in their respective pump barrels, and that in each of the pairs of pumps the piston on one side of the partition wall between them will approach the same as the other recedes therefrom. Now before applying power thereto the respective chambers are all filled with oil, or other liquid, oil being the preferred liquid. Now when the pump pistons are in the position shown in Fig. 3 and the other parts as shown in Fig. 2 and some of the other figures, the movement of the pump plungers will cause the oil to be forced out of the chamber n and thence into the suction chamber to which it is connected from whence it will flow into the channel above such suction chamber passing therethrough into and through the valve chamber and out through the channel connected therewith which leads into the compression cylinder at the rear of the piston, thereby causing the outward movement thereof to carry the compression plunger through the bottom of the reception chamber to force the hay into the baling chamber. As the compression plunger piston moves outwardly the oil from the outer end thereof is forced through channel 86 which is also connected with the oil distributing chamber 41, from which chamber the oil passes to supply chambers 39 and 43, then into those suction chambers that are not connected with the pumping chamber from which oil is being forced out of, and thence through the connecting channels into the pumping chamber whose pistons are moving away from the dividing partition.

Just before the compression piston reaches the outer end of the compression cylinder, the pin 87′ mounted on rod 17 engages arm 88 rigidly secured to shaft 89, and by the time said piston has reached the full outward limit of its stroke said pin moves said arm to partially rotate said shaft. To shaft 89 is secured a resilient arm 90 which passes through an eye 91 of the central arm 92 of the reversing dog 93. The reversing dog 93 is pivoted on arm 94, and arm 94 is rotatably mounted upon axle 95. Arm 94 carries a stud 94′ which projects between pins 97 and 98 rigidly secured to the connecting rod 72 and said arm is rocked on shaft 95 by the reciprocation of rod 72, but until arm 88 is engaged by either of the pins 87 or 87′ the rocking movement of arm 94 upon shaft 95 will not affect the position of valve 49. Shaft 95 is provided with shoulders 99 and 100 with which the side arms 101 and 102 of the reversing dog are adapted to engage respectively when the reversing dog is thrown by spring arm 90 from one position to another. Axle 95 carries valve 96 which works in valve chamber 49 and whenever shaft 89 is partially rotated said valve is shifted to reverse the flow of liquid into and out of the compression cylinder. Just before the compression piston reaches the inner end of the compression cylinder, pin 87 engages with arm 88 and by the time said piston has reached the full inward limit of its stroke said pin moves said arm to partially rotate said shaft in the reverse direction to which it was rotated when pin 87′ contacted with said arm, whereby through the parts before described valve 49 is again turned to reverse the flow of liquid into and out of the compression cylinder.

In Fig. 6 the position of the parts is shown just after the valve 96 has been thrown to reverse the flow of oil from the direction in which the oil is flowing as shown in Fig. 2, when the plunger piston will travel in the reverse direction and the flow of oil will also be in the reverse direction to that shown in Fig. 2 and before described. On the backward movement of the compression piston plunger the oil will flow to the compression piston chamber through channel 86 and will be forced out of the other end and back into the distributing chamber through channel 30. That portion of the oil which remains in the abutment cylinder and in the compression plunger stem passes through an upwardly opening check valve 103 in the rear portion of the abutment cylinder.

The completion of the backward stroke of the compression plunger causes pin 87 to engage arm 88 which causes the reversal of the position of the valve 96 and the oil then flows in the reverse direction driving the plunger on its forward course to compress the hay into the baling chamber. Pins 87 and 87′ are secured in bar 17 which bar is carried by the compression plunger head.

In the formation of the latter part of the bale more pressure is required than in the formation of the first part of the bale and in order to obtain this high pressure with a medium amount of power, the forward pumps are cut out as follows: We will say that it requires 200 pounds pressure to effect the final compression of the hay, in such case the spring in the pressure regulating chamber has a regulated tension of 100 pounds. Now when the pressure rises to an amount in excess of 100 pounds, piston 62 will be forced downwardly to compress the spring thereby opening port 66 and permitting the oil pumped by the forward pumps to pass through port 66 and thence through pipe 70 into the storage reservoir from whence it may pass into the supply chamber 39. This relieves the pressure on the upper face of valve gate 59 and it immediately seats itself and closes port 58, and thereafter as long as the compression plunger is on its outward stroke it is moved by the pressure of the oil forced by the rear pumps, which pumps may now be driven to exert the required pressure upon the hay. The reversal of the flow of oil restores the equilibrium and on the return movement of the compressor plunger both pumps operate to return it, and in sending the compression plunger outwardly on its compression stroke the pumps all operate together as before explained until the compression power rises to an excess of 100 pounds when the forward pumps are cut out as before explained.

By this construction when the pressure is low, great rapidity of movement of the parts is obtained, and when the pressure must be high a portion of the pumping mechanism is cut out, thereby giving the parts a slower motion but enabling the use of the other parts to give the desired pressure with a minimum amount of power.

Where great compression of power is desired, the pumps which perform the final compression may have the piston area thereof smaller than those which are cut out when the pressure rises to a predetermined point.

If desired, the compression plunger may be operated by a single pair of pumps.

I have illustrated my hay press as being operated by four pairs of pumps, as that number of pumps I have found in practice produces a very satisfactory and quick acting press, which may be operated with the minimum of power.

By an application filed January 11th, 1905, No. 240,628 I describe and claim the baling mechanism shown herein, said application being a division of this application.

Having described my invention, what I claim as new and desire to secure by Letters Patent, is:—

1. In pumping mechanism for baling presses the combination of a compression plunger adapted to reciprocate; a hollow stem secured to said plunger; a piston chamber into which stem passes, having ports at the opposite ends thereof; a piston secured to said stem within said chamber between the ports at the ends thereof, said piston having a central aperture therein; a hollow abutment cylinder secured to the end of said piston chamber opposite the compression plunger and adapted to pass into the aperture in the piston; an outwardly opening check valve connecting the rear end of the interior of the abutment cylinder with the piston chamber; means to supply oil into said abutment cylinder while the piston is moving on and away from the rear end of said abutment cylinder; an inwardly opening check valve on said supply; and means to alternately force liquid into said chamber at the opposite ends thereof.

2. In pumping mechanism for baling presses the combination of a compression plunger adapted to reciprocate; a hollow stem secured to said plunger; a piston chamber into which said stem passes, said chamber having ports at the opposite ends thereof; a piston secured to said stem within said chamber between said ports, said piston having an aperture extending centrally therethrough; a hollow abutment cylinder secured to the end of said piston chamber opposite the compression plunger and adapted to pass into the aperture in the piston; means to alternately force the liquid into the piston chamber at the opposite ends thereof; a liquid reservoir; a pipe connecting said reservoir with the interior of said abutment cylinder near its junction with the piston chamber and opening thereinto; a check valve on said pipe; and a check valve on the rear end of said abutment cylinder.

3. In pumping mechanism for baling presses means to reverse the flow of liquid therein comprising a valve having an axle; shoulders on said axle; an arm loosely and rotatively mounted on said axle; a reversing dog having arms adapted to alternately engage the shoulders on said axle mounted on said arm; means to operate said arm; means to operate said dog.

4. In pumping mechanism for baling presses means to reverse the flow of liquid therein comprising a valve having an axle; shoulders on said axle; an arm loosely and rotatively mounted on said axle; a reversing dog having arms adapted to alternately engage the shoulders on said axle mounted on said arm; means to operate said arm comprising a rod having two pins adapted to engage and move said arm; means to operate said rod; means to operate said dog comprising a spring arm connected thereto, said arm being pivoted to a support; a rod carrying pins, said pins being adapted to alternately engage the lower end of said spring arm; means to move said last rod.

5. In a mechanism of the character described herein, the combination of a compression plunger adapted to compress material therein; a compression plunger piston chamber; a piston operatively connected to said plunger; a valve chamber; channels connecting said valve chamber with the opposite ends of said piston chamber; a distributing chamber in communication with said valve chamber; a plurality of pumps connected with said distributing chamber, each pump having a separate connection in part; check valves on said connections, one for each pump, a channel connecting one half of said pumps with said valve chamber, a second channel connecting the other half of said pumps, through a port, with said last channel; a regulating piston chamber in communication with said channel leading from the pumps to the other channel; a partition in said regulating chamber having a port therein; a valve having a hollow stem projecting through said port, a piston on said stem; a spring between said partition and piston having a predetermined tension; a valve having a hollow stem and said stem passing through the port, affording communication between said channels, thence through the hollow stem of the valve in the regulating chamber and through the piston on said stem; a connection between said regulating chamber between said partition and piston and said distributing chamber; a valve in said valve chamber adapted to alternately open the communication between a channel leading from a pump to the valve chamber and a channel from the valve chamber to the piston chamber and at the same time to open communication between a channel leading from the other end of the piston chamber to the valve chamber and the communication with the distributing chamber and then to be moved to reverse said communications; means to move valve.

In witness that I claim the foregoing I have hereunto subscribed my name this 23rd day of April, 1904.

SAMUEL C. BEALE.

Witnesses:
G. E. HARPHAM,
HENRY T. HAZARD.